United States Patent [19]

King

[11] Patent Number: 5,519,805
[45] Date of Patent: May 21, 1996

[54] SIGNAL PROCESSING ARRANGEMENTS

[75] Inventor: Reginald A. King, Shrivenham, England

[73] Assignee: Domain Dynamics Limited, Lancashire, United Kingdom

[21] Appl. No.: 229,062

[22] Filed: Apr. 18, 1994

Related U.S. Application Data

[63] Continuation of Ser. No. 836,691, Feb. 18, 1992, abandoned.

[30] Foreign Application Priority Data

Feb. 18, 1991 [GB] United Kingdom ............ 9103349

[51] Int. Cl.⁶ .................................................. G10L 9/00
[52] U.S. Cl. .................................................. 395/2.11
[58] Field of Search ................. 395/2.4–2.66, 395/21–22, 2–2.11; 381/45–53

[56] References Cited

U.S. PATENT DOCUMENTS

| | | | |
|---|---|---|---|
| 5,091,949 | 2/1992 | King | 395/2.62 |
| 5,111,516 | 5/1992 | Nakano et al. | 382/14 |
| 5,136,653 | 8/1992 | Kumagai et al. | 381/43 |
| 5,161,204 | 11/1992 | Hutcheson et al. | 382/16 |

OTHER PUBLICATIONS

Kowalewski et al. "Word Recognition with a Recurrent Neural Network", *Parallel Processing in Neural Systems and Computers*, Elsevier Sci Pub., 1990, pp.391–394

Chong et al. "Classification and Regression Tree Neural Networks For Automatic Speech Recognition", Inter. Neural, Network Conf. INNC 90, Paris, Jul./1990, pp. 187–190.

Krause et al., "Scaly Artifical Neural Networks For Speaker—Independent Recognition of Isolated Words", 1989 IEEE, pp. 21–24.

*Primary Examiner*—Allen R. MacDonald
*Assistant Examiner*—Michelle Doerrler
*Attorney, Agent, or Firm*—Keck, Mahin & Cate

[57] ABSTRACT

A signal processing system for time varying band-limited signals such as speech comprises signal coding means for affording a time encoded signal symbol stream, a matrix generator for generating a fixed size, typically "A" matrix from the symbol stream, and an artificial neural network to which the matrix elements are applied for network training and subsequently for affording an output indicative of the nature of an input signal.

10 Claims, 4 Drawing Sheets

Fig. 2

| | 01 | 02 | 03 | 04 | 05 | 06 | 07 | *08 | 09 | *10 | 11 | *12 | *13 | 14 | *15 | 16 | *17 | 18 | *19 | *20 | *21 | *22 | 23 | *24 | *25 | *26 | *27 | *28 | 29 |
|---|---|---|---|---|---|---|---|---|---|---|---|---|---|---|---|---|---|---|---|---|---|---|---|---|---|---|---|---|---|
| 01 | 22 | | | | | | | | | | | | | | | | | | | | | | | | | | | | |
| 02 | | 40 | | 10 | | | | | | | | | | | | | | | | | | | | | | | | | |
| 03 | | | 70 | 74 | | 26 | | | | | | | | | | | | | | | | | | | | | | | |
| 04 | | 11 | 66 | | | | | | | | | | | | | | | | | | | | | | | | | | |
| 05 | | | | | | | | | | | | | | | 30 | | | | | | | | | | | | | | |
| 06 | | | 25 | | | | | | | | | | | | | | | | | | | | | | | | | | |
| 07 | | | | | | | | | | | | | | | | | | | | | | | | | | | | | |
| *08 | | | | | | | | | | | | | | | | | | | | | | | | | | | | | |
| 09 | | | | | | | | | | | | | | | | | | | | | | | | | | | | | |
| *10 | | | | | | | | 10 | | 74 | | | | | | | | | | | | | | | | | | | |
| 11 | | | | | | | | | | | | | | | | | | | | | | | | | | | | | |
| *12 | | | | | | | | | | | | | | | | | | | | | | | | | | | | | |
| *13 | | | | | | | | | | | | | | | | | | | | | | | | | | | | | |
| 14 | | | | | | | | | | | | | | | | | | | | | | | | | | | | | |
| *15 | | | | | | | | | | | | | | | | | | | | | | | | | | | | | |
| 16 | | | | | | | | 33 | | | | | | | | | | | | 66 | | | | | | | | | |
| *17 | | | | | | | | | | | | | | | | | | | | | | | | | | | | | |
| 18 | | | | | | | | | | | | | | | | | | 187 | | 56 | | | | | | | | | |
| *19 | | | | | | | | | | | | | | | | | | 182 | 220 | | | | | | | | | | |
| *20 | | | | | | | | | | | | | | 51 | | | | | | | | | | | | | | | |
| *21 | | | | | | | | | | | | | | | | | | | | | | | | | | | | | |
| *22 | | | | | | | | | | | | | | | | | | | | | | | | | | | | | |
| 23 | | | | | | | | | | | | | | | | | | | | 63 | | | | | | | | | |
| *24 | | | | | | | | | | | | | | | | | | | | | | | | | | | | | |
| *25 | | | | | | | | | | | | | | | | | | | | | | | | | | | | | |
| *26 | | | | | | | | | | | | | | | | | | | | | | | | | | | | | |
| *27 | | | | | | | | | | | | | | | | | | | | | | | | | | | | | |
| *28 | | | | | | | | | | | | | | | | | | | | | | | | | | | | | |
| 29 | | | | | | | | | | | | | | | | | | | | | | | | | | | | | |

SIGNAL PROCESSING ARRANGEMENTS

This is a continuation of application Ser. No. 07/836,691, filed Feb. 18, 1992, now abandoned.

This invention relates to signal processing arrangements, and more particularly to such arrangements which are adapted for use with time varying band-limited input signals, such as speech, and which incorporate artificial neural network processors.

Artificial neural networks have been known since the early 1940's. They describe a computational system consisting of "neurons" receiving input from a number of other such neurons, or possibly from an external source, and sending its output to other neurons or perhaps to the output of the system. Some key papers on the development of these concepts are listed below.

(1) D. O. Hebb. The Organisation of Behaviour. Wiley and Sons, New York, 1949.
(2) F. Rosenblatt. the perceptron: a probabilistic model for information storage and organization in the brain. Psychological Review, (65): 368–408, 1958.
(3) M. L. Minsky and S. A. Papert. Perceptrons. MIT Press, 1969.
(4) J. J. Hopfield. Neural networks and physical systems with emergent collective computational abilities. Proc. Natl. Acad. Sci. USA, 79:2554–2538, April 1982.
(5) D. H. Ackley, G. E. Hinton, and T. J. Sejnowski. A learning algorithm for boltzmann machines. Cognitive Science, 9:147–169, 1985.
(6) J. L. McClelland and D. E. Rumelhart. Parallel Distributed Processing: Volumes 1 and 2. Bradford Books, MIT Press, 1986.
(7) Proceedings of the 1st International Conference on Neural Networks, San Diego, 1987.
(8) T. Kohonen. Self-organisation and Associative Memory. Springer-Verlag, 1988.

In general it will be appreciated that artificial neural networks are configured to provide an input layer consisting of a fixed number of elements, a number of hidden layers each consisting of a fixed number of elements, and an output layer consisting of a fixed number of elements.

It has been established that such multi-layer artificial neural networks are very good at discriminatory tasks but that they do not perform well with time varying input data. For example, band-limited events such as speech and acoustic signals which are conventionally described in terms of Time Sequence Data are very difficult for these networks to handle because of the requirement to map such data into a fixed number of input descriptors for interfacing with the fixed size input layer of the artificial neural network.

A range of procedures, such as "time delay networks", have been adopted to facilitate this "variable n" to "fixed m" mapping requirement, sometimes described as "spatio-temporal recognition and classification". All such procedures involve great complexity in data description, in data processing and in data manipulation, see, for example, references (9) to (11) set out below:

(9) P. J. C. Skitt and R. C. Witcomb. The Analysis of the Acoustic Emission of Jet Engines using Artificial Neural Networks. Condition Monitoring Diagnostic Technology, Volume 1 Number 1 June 1990.
(10) Rodellar V., et al & . . . Munoz M. L. and Gomez P. A Neural Network For The Extraction And Characterization Of The Phonetic Features of Speech. Fourth International Conference Neural Networks and Their Applications, Proceedings and Exhibition Catalog. Nimes, France. Nov. 4–8, 1991, pages 203–212, ISBN 2-906899-67-4.
(11) Maren, Alianna J. Neural Networks For Spatio-Temporal Pattern Recognition. Handbook of Neural Computing Applications. Maren, A. J., Harston C. & Pap, R. The Academic Press, Inc. 1990 pages 295–308. ISBN 0-12-546090-2.

As an example, acoustic inputs such as speech, the acoustic output of machinery, and other time varying signals are often formed into Time Varying Spectrographic templates consisting of a varying multiplicity of short time segments. To enable this material to be presented to an artificial neural network, each template is reduced to a standard number of segments, by such means as linear time normalisation, or non-linear "Dynamic Time Alignment", which are computationally intensive procedures which attempt to produce a fixed size input capable of capitalising on the many very powerful properties of the artificial neural network procedures. So far little commercial success has been achieved by these means which apart from being enormously complicated and computationally intense, are substantially vulnerable to variabilities associated with noise and other artifacts.

For a number of years now the Time Encoding of speech signals as described in U.K. Patent No. 2145864 and corresponding U.S. Pat. No. 5,091,949 and European Patent No. 0141497 and in reference (12) set out below, has been known, as a means for the economical coding of time varying speech signals into a plurality of Time Encoded Speech (TES) descriptors or symbols to afford a TES symbol stream, and for forming such a symbol stream into fixed dimensional, fixed size data matrices, where the dimensionality and size of the matrix is fixed, a priori, by design, irrespective of the duration of the input speech event to be recognised.

(12) J. Holbeche, R. D. Hughes, and R. A. King. Time Encoded Speech (TES) descriptors as a symbol feature set for voice recognition systems. In IEE Int. Conf. Speech Input/Output; Techniques and Applications, pages 310–315, London, March 1986.

By these means TES matrices, and typically "A" matrices, derived from time variable input speech, words or phrases, may be compared with identically sized matrices comprising archetypal descriptions of speech events generated, as described in the above patents and in reference (12).

It has been discovered that the TES procedures as described in the above mentioned patents and in reference (12) are not restricted to speech signals and may also be applied to any band-limited waveform, irrespective of its origin. To cover the coding of non-speech signals, as well as speech signals by these means, and as an aid to clarity, in the subsequent paragraphs of this application, TES procedures as detailed in the above mentioned patents and in reference (12) will be described as Time Encoded signals.

It should be appreciated that references in this document to Time Encoded Speech, or TES, or Time Encoded signals, are intended to indicate solely, the concepts and processes of Time Encoding, set out in the aforesaid patents and in reference (12) and not to any other processes.

It has now been discovered that a Time Encoded signal symbol stream and a Time Encoded signal matrix derived therefrom represents a data description of time varying band-limited signals which is ideally matched to the requirements of artifical neural network architectures and that by coding the time sequence events such as speech, or other time varying band-limited signals into fixed sized Time Encoded signal Matrices, time sequence learning utilising simple conventional artificial neural networks, may simply be achieved, irrespective of the time variability of the input signal e.g. speech or other band-limited signal.

It is an object of the present invention therefore to provide an improved form of signal processing arrangement for a time varying band-limited signal, based on an artificial neural network processor which makes use of the advantages of the time encoding of such signals.

According to the present invention there is provided a signal processing arrangement for a time varying band-limited input signal, comprising coding means operable on said input signal for affording a time encoded signal symbol stream, means operable on said symbol stream for deriving matrix dependent signals corresponding to a fixed size matrix formable from said symbol stream, and artificial neural network processing means responsive to said matrix dependent signals for affording an output indicative of said input signal.

In one arrangement for carrying out the invention it may be arranged that the means operable on said symbol stream is effective for deriving a fixed size matrix of data elements corresponding to said symbol stream, each of said data elements being connected as an input to said artificial neural network processing means, or alternatively said artificial neural network processing means may be of "skeletonised" form in which case only some of said data elements may be connected as inputs to said artificial neural network processing means, thereby enabling the number of inputs thereof to be reduced.

In another arrangement for carrying out the invention there may be provided data processing means operable on the matrix dependent signals for affording outputs to said artificial neural network processing means.

It may be arranged that said data processing means is effective for carrying out numerical processing e.g. addition, subtraction, ratios, etc. of selected ones of said matrix dependent signals.

In carrying out the invention, means may be provided for storing the matrix dependent signals or signals derived therefrom for input signals input to said arrangement during a training phase, said artificial neural network processing means being responsive to said stored signals for setting the characteristics (e.g. relative weightings) thereof.

It may be arranged that an arrangement in accordance with the present invention takes the form of a signal identification arrangement, wherein said artificial neural network processing means comprises a plurality of outputs each corresponding to an output signal to be recognised or alternatively takes the form of a signal verification arrangement, wherein said artificial neural network processing means comprises two outputs which are indicative of the verification of an input signal.

Advantageously, said fixed size matrix takes the form of an "A" matrix or any other suitable matrix, and the input signal may comprise a speech signal consisting of one or more words or phrases, or other time varying band-limited signal derived from machinery or other mechanical artefacts, vehicles, ships, seismic occurrences, medical signals, handwriting, etc.

Some exemplary embodiments of the invention will now be described reference being made to the accompanying drawings, in which:

FIG. 2 depicts a typical "A" matrix derived from a time encoded signal symbol stream;

In U.S. Pat. No. 2,145,864 and in reference (12) already referred to, it is described in detail how a speech waveform, which may typically be an individual word or a group of words, may be coded using time encoded speech (TES) coding, in the form of a stream of TES symbols, and also how the symbol stream may be coded in the form of, for example, an "A" matrix, which is of fixed size regardless of the length of the speech waveform.

As has already been mentioned, it has now been appreciated that the principle of TES coding is applicable to any time varying band-limited signal as well as speech, and accordingly reference will be made herein to time encoded "signal" coding which is meant to cover both speech and non-speech signals.

Figure 1:
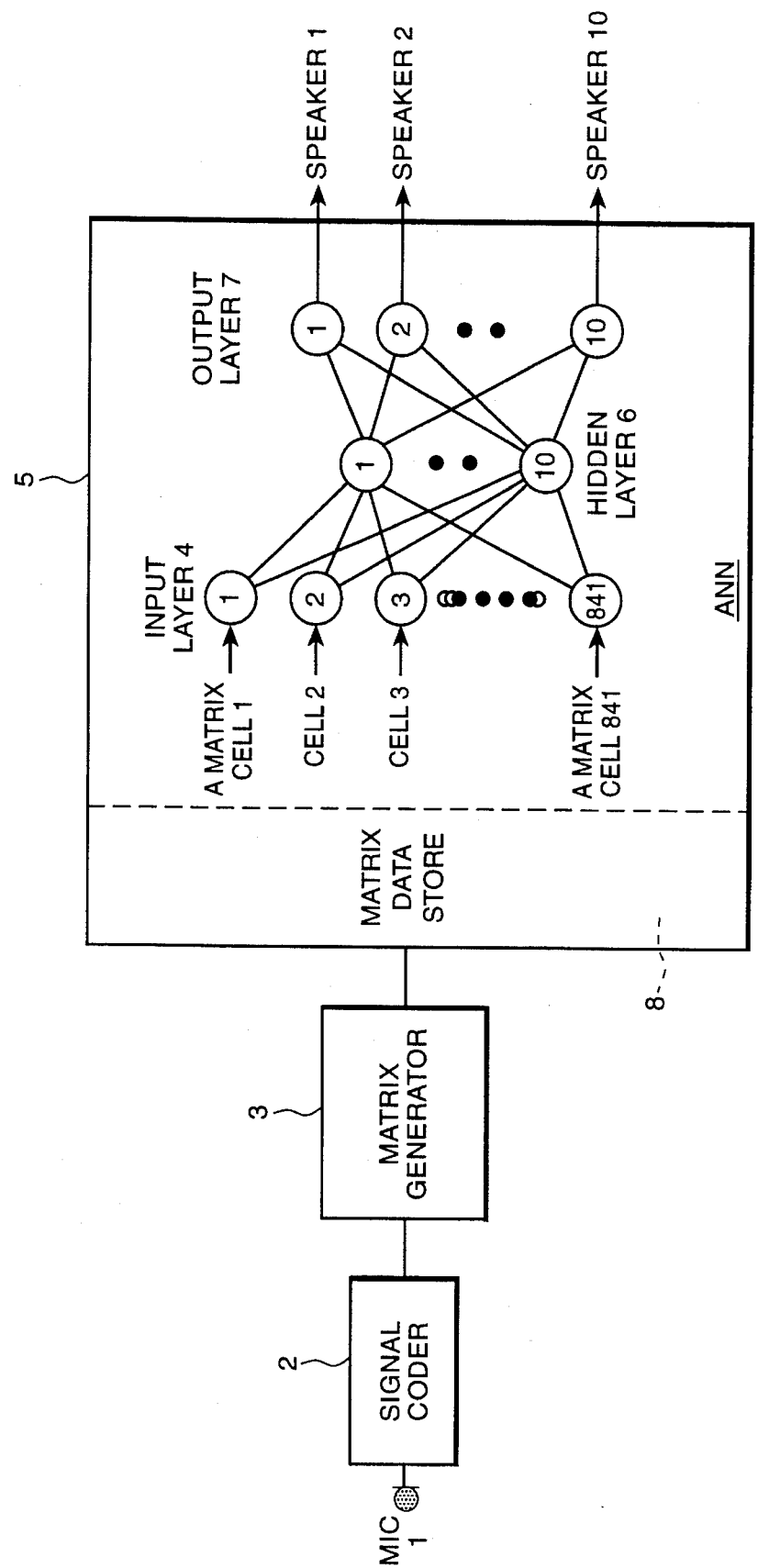
FIG. 1 is a block schematic diagram of a speaker identification arrangement in accordance with the present invention.

In FIG. 1 of the drawings there is shown a block schematic diagram of a speaker identification arrangement in accordance with the present invention for identifying any one of ten speakers in response to the recital of a particular word or phrase by a particular speaker.

The arrangement comprises a microphone (MIC) 1 into which the particular word or phrase is spoken, the output of the microphone 1 being connected to a signal coder 2 which generates a time encoded signal symbol stream in dependence upon the spoken word or phrase. The coded output from the signal coder 2 is fed to a matrix generator 3 for generating a fixed size, typically 29×29 "A" matrix from the symbol stream. A typical "A" matrix is shown in FIG. 2 of the drawings, and corresponds essentially to the "A" matrix depicted in Diagram 4 of reference (12).

The "A" matrix generated by the matrix generator 3 consists essentially of a two co-ordinate array of cells, there being a total of (29×29) 841 cells, and these cells are connected in consistent order to the input layer 4 of an artificial neural network (ANN) 5. The input layer 4 of the ANN 5 accordingly comprises 841 inputs numbered 1 to 841 and these are connected in well known fashion to each of ten inputs 0 to 10 of a hidden layer 6 of the ANN 5 and thence to each of ten inputs 0 to 10 of the output layer 7 of the ANN 5. The outputs from the output layer 7 are output as "Speaker 1", "Speaker 2" . . . "Speaker 10". It will be appreciated that the ANN 5 may comprise more than one hidden layer 6 and the number of inputs to the hidden layer 6 may be chosen to suit any particular application. In the example shown a simple back error propagation network structure is shown for the ANN 5, but it will be appreciated that other structures could be used.

Before making use of the speaker identification arrangement of FIG. 1 it is necessary for it to be "trained" to identify each of the ten speakers to be identified. This is achieved by providing a training phase in which each speaker recites e.g. twenty times into the microphone 1 a common input phrase e.g. "My name is Charles Westlake". Thus, during the training phase, twenty "A" matrices will be generated by the matrix generator 3 for each of the speakers, and these matrices are stored in the matrix data store 8 which forms part of the ANN 5. The ANN 5 is then operated in its training mode in respect of all the stored matrices for each speaker in order to determine its various weighting coefficients, typically using high resolution floating point arithmetic, necessary to identify each particular speaker. In this respect the highest number in the output layer 7 of the ANN 5 is normally used to indicate the identified output and thus the identified speaker to a level consistent with the application (e.g. average convergence factor=0.1).

Once training has been achieved, the arrangement is then ready for operation and identification of any one of the speakers may be achieved in response to the common input phrase being spoken into the microphone 1.

Figure 3:
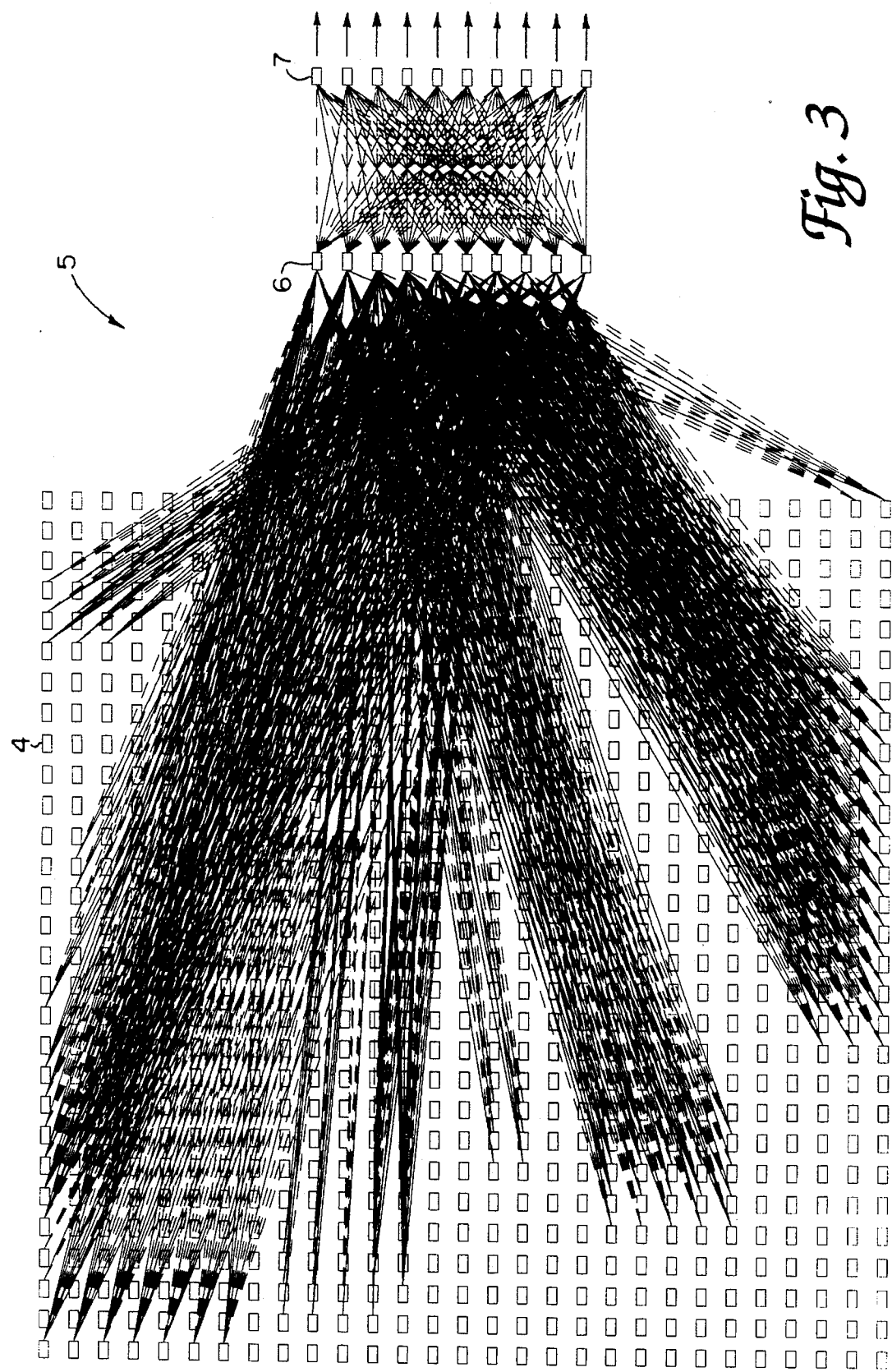
FIG. 3 is a diagrammatic representation of a "skeletonised" artificial neural network.

In the speaker identification arrangement of FIG. 1 each of the 841 cells of the 29×29 "A" matrix afforded by the matrix generator 3 are connected consistently to corresponding inputs of the input layer 4 of the ANN 5. This necessarily requires the input layer 4 to have 841 inputs. It has been discovered, however, that the ANN 5 may be of "skeletonised" form, a structure which is well known in the ANN art, in which weighted interconnections which, after training, have a value less than a given value are omitted, thereby enabling an ANN 5 to be used having fewer inputs in its input layer 4 and also necessitating fewer connections to be made between the matrix generator 3 and the ANN 5. A skeletonised form of ANN 5 is shown in FIG. 3 of the drawings, in which the normal 841 inputs of the input layer 4 are, for convenience, depicted in the form of a co-ordinate array which corresponds to the "A" matrix generated by the matrix generator 3. As can been seen from FIG. 3, only some of the inputs of input layer 4 are connected to the hidden layer 6 of the ANN 5, these corresponding to those weighted interconnections having a value above a given value. In an actual experiment it has been found that the number of inputs to the input layer 4 of the ANN 5 may be reduced by 80% without substantially affecting the operation of the arrangement of FIG. 1 in identifying the ten speakers.

It has been found that the arrangement of FIG. 1 is highly resistant to changes in speaker diction caused for instance by the individual speaker having, say a cold or dental anaesthesia, or a benign obstruction such as a sweet or pipe stem in their mouth, or a range of other benign traumas.

Further it has been found that such arrangements trained with acoustic inputs at one point in time will successfully discriminate the speakers concerned many months later, such that in any system re-training would not normally be necessary at short intervals (e.g. less than 12 months).

It has also been found that the arrangement of FIG. 1 is extremely resistant to acoustic background noise and, in the role described, correct identification may be achieved in high and variable noise backgrounds.

The speaker identification arrangement which has been described with reference to FIG. 1 relies on the generation of a matrix, typically an "A" matrix, by the matrix generator 3 from the time encoded signal symbol stream afforded by the signal coder 2. It has been appreciated, however, that for many of the applications envisaged for the present invention significant reductions in the size and complexity of the arrangement of FIG. 1 may be made which, in some cases, can obviate the need for the matrix generator 3 of FIG. 1.

Figure 4:
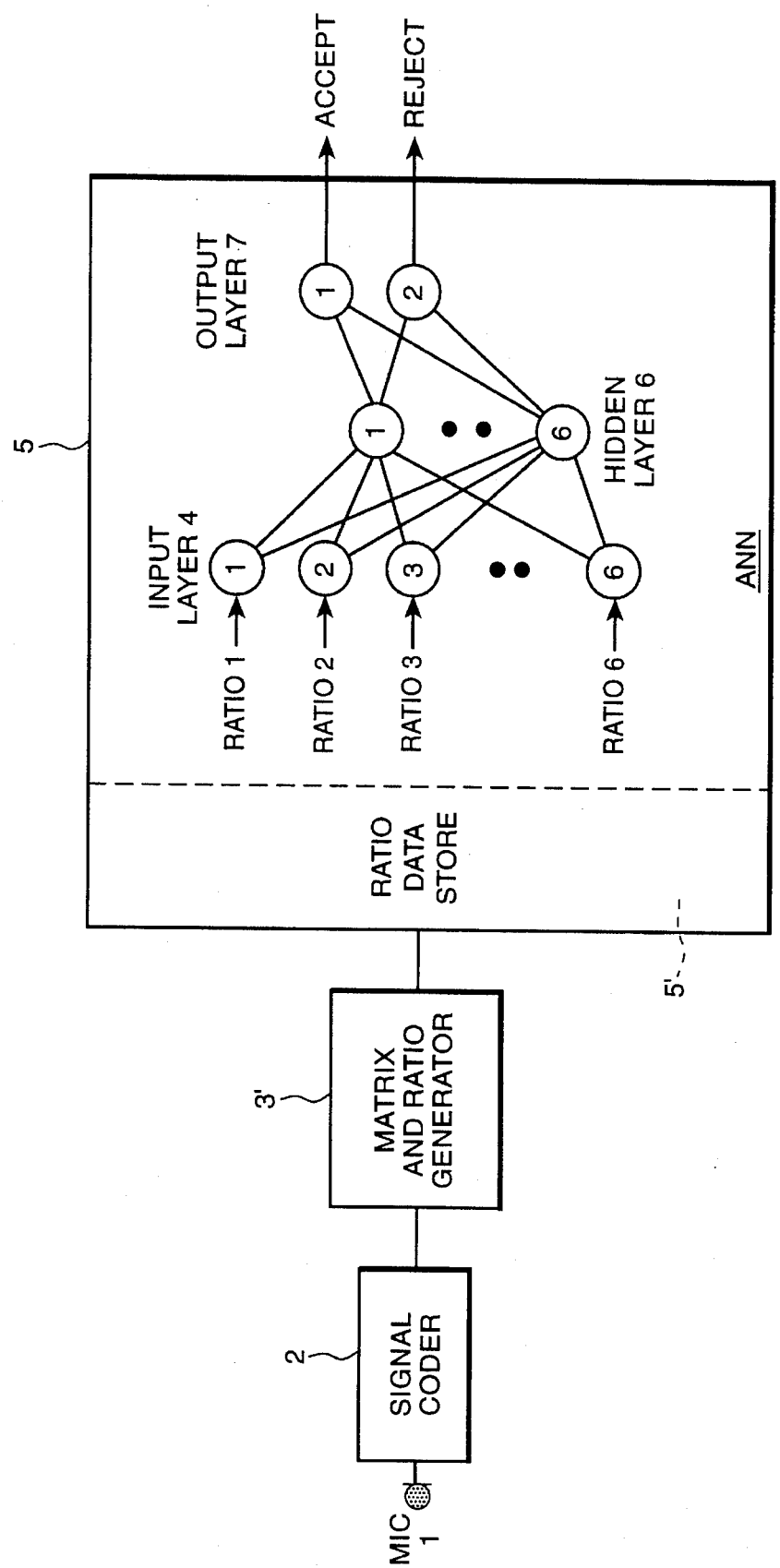
FIG. 4 is a block schematic diagram of a speaker verification arrangement in accordance with the present invention.

In FIG. 4 of the drawings there is shown a speaker verification arrangement in accordance with the present invention which is designed to verify whether a speaker, reciting a given word or phrase into the microphone 1 of the arrangement, is who he or she claims to be.

The arrangement of FIG. 4 comprises a microphone (MIC) 1 the output of which is connected to a signal coder 2 which generates a time encoded signal symbol stream in dependence upon the spoken word or phrase. The coded output from the signal coder 2 is fed to a matrix and ratio generator 3' which, in its basic form, generates a fixed size, typically "A" matrix from the symbol stream.

However, instead of each element or at least some of the elements of the "A" matrix being connected directly to the input layer 4 of the ANN 5 as in the arrangement of FIG. 1, it has been found that the 841 matrix elements may be converted into a much smaller set, typically six, of representative numerical functions such as sums, ratios, etc. of the matrix elements.

As an illustrative example, the 29×29 "A" matrix of FIG. 2 may be reduced to six numerical functions, each corresponding to a ratio as follows. In this respect it is to be noted that some of the time encoded symbols numbered 0 to 29 in the two axes of the matrix shown in FIG. 2 are considered to be "complex", as is well known in the art, and these have been marked with an asterisk (*).

Ratio 1=Sum simple element values/Sum complex element values.

Ratio 2=Sum element values on the matrix diagonal/Sum element values off the diagonal.

Ratio 3=Sum element values in rectangle 1,1 to 10,10/Sum element values in rectangle 11,11 to 28,28.

Ratio 4=Sum of simple element values in rectangle 1,1 to 9,9/Sum simple element values in rest of matrix.

Ratio 5=the number of cells of the matrix occupied in the rectangle bounded by 1,1 and 10,10/number of cells occupied in the rest of the matrix.

Ratio 6=The number of cells occupied in the top matrix triangle, i.e. all cells between 1,29 and 29,1/Number of cells occupied in the rest of the matrix.

From the "A" matrix of FIG. 2:

$$\text{Ratio 1} = \frac{22+40+10+70+74+26+11+66+25+187}{30+10+74+33+66+56+182+220+51+63}$$

$$= \frac{531}{785}$$

$$\therefore \text{Ratio 1} = 0.6764$$

$$\text{Ratio 2} = \frac{22+40+70+74+187+220}{10+74+26+11+66+30+25+10+33+66+56+182+51+63}$$

$$= \frac{613}{703}$$

$$\therefore \text{Ratio 2} = 0.8719$$

$$\text{Ratio 3} = \frac{22+40+10+70+74+26+11+66+25+10+74}{66+187+56+182+220+51+63}$$

$$= \frac{428}{825}$$

$$\therefore \text{Ratio 3} = 0.5188$$

$$\text{Ratio 4} = \frac{22+40+10+70+74+26+11+66+25}{187}$$

$$= \frac{344}{187}$$

∴ Ratio 4 = 1.8396

Ratio 5 = $\frac{11}{9}$

∴ Ratio 5 = 1.22

Ratio 6 = $\frac{13}{7}$

∴ Ratio 6 = 1.8571

The six ratios derived by the matrix and ratio generator 3' are coupled to the six inputs 0 to 6 of the input layer 4 of the ANN 5 and have been found to be sufficient to describe economically the speaker to be verified.

The speaker verification arrangement of FIG. 4 would be trained in a similar manner to that of the arrangement of FIG. 1 with say 20 versions of a speaker inputting his standard test phrase, to provide training data for the "Accept" output of the ANN 5 and a combination of many other speakers acoustic output would be used to provide training data for the "REJECT" output of the ANN 5. The training data, in the form of ratios 1 to 6 for the speaker in question and for the other speakers is stored in a ratio data store 5' which forms part of the ANN 5.

It should be appreciated that in some applications, the ratios 1 to 6 afforded by the matrix and ratio generator 3' of FIG. 3 may be derived directly, using suitable processing, from the time encoded signal symbol stream afforded by the signal coder 2, thus obviating the need for an actual matrix generator.

The embodiments of the invention which have so far been considered have been described in relation to speech identification or verification. It should be appreciated that the invention has a much broader application in that it is applicable to any time varying band-limited signal which may be derived by any suitable means and may derive, for example, from machinery or other mechanical artefacts, vehicles, ships, seismic occurrences, medical signals, handwriting e.g. from dynamic signature validation equipment, etc.

The process may be applied in application areas such as speech recognition, speaker verification, speaker identification, Condition Monitoring and Diagnostic Technology, in the recognition of the acoustic output of severely handicapped speakers, and in any area where band-limited time varying events are required to be classified or recognised, or identified or discriminated between.

I claim:

1. A signal processing system for discriminating time varying band-limited input signals comprising means for generating a plurality of time varying band-limited input electrical analog signals such as speech from a plurality of entities to be discriminated, a signal coder for time encoding each of the input signals into a plurality of time encoded symbols to afford a time encoded signal symbol stream, a matrix generator for generating a fixed size matrix composed of a plural coordinate array of cells, said matrix generator receiving each of the time encoded signal symbol streams and coding each said signal symbol stream into the cells of a fixed size matrix generated by the matrix generator, and said matrix generator having a plurality of outputs correlated in number with the cells of the fixed size matrix, a matrix data store for storing multiple sample matrices generated by the matrix generator, and an artificial neural network processor comprised of an input layer, a hidden layer, an output layer, the input layer of the ANN (artificial neural network) having a plurality of inputs correlated in number with the plurality of outputs from the matrix data store for receiving the contents of individual cells of the fixed size matrix, the output layer of the ANN having a plurality of outputs correlated to the entities to be discriminated, the hidden layer of the ANN having a plurality of inputs and outputs correlated to and connected to the inputs of the input layer and the outputs of the output layer, respectively, the multiple sample matrices stored in the matrix data store being indicative of each of the plurality of entities from which the characteristics of the ANN can be set to effect discrimination as between the entities.

2. A signal processing system according to claim 1 further comprising a skeletonizing means for employing a parameter of the cell contents of the fixed size matrices to skeletonize the outputs from the matrix generator to substantially reduce the requirements for inputs to the input layer of the ANN.

3. A signal processing system according to claim 2 wherein the parameter is a preselected value for cell content whereupon the contents of all cells are discarded which are less than said preselected value.

4. A signal processing system according to claim 1 wherein weighting coefficients are generated from the multiple sample matrices and used for setting the characteristics of the ANN.

5. A signal processing system according to claim 1 further including arithmetic means for conducting arithmetic operations on preselected cells of a fixed size matrix generated by the matrix generator to provide an output indicative thereof, data storage means for storing training data correlated to arithmetic operations conducted by the arithmetic means on multiple sample matrices, and comparator means for comparing the output of the arithmetic means with the training data to verify an entity.

6. A method for signal processing for discriminating time varying band-limited input signals comprising the steps of generating a plurality of time varying band-limited input electrical analog signals such as speech from a plurality of entities to be discriminated; time encoding each of the input signals into a plurality of time encoded symbols to afford a time encoded signal symbol stream, generating a fixed size matrix composed of a plural coordinate array of cells for receiving each of the time encoded signal symbol streams; coding each said signal symbol stream into the cells of a fixed size matrix, outputting from the matrices a number of outputs correlated in number with the cells of the fixed size matrix, storing multiple sample matrices indicative of the plurality of entities, and processing the outputs through an artificial neural network processor comprised of an input layer, a hidden layer, and an output layer, including inputting the stored multiple sample matrices into the input layer of the ANN which has a plurality of inputs correlated in number with the outputs from the matrices, the output layer of the ANN having a plurality of outputs correlated to the entities to be discriminated, the hidden layer of the ANN having a plurality of inputs and outputs correlated to and receiving the inputs of the input layer and for outputting to the outputs of the output layer, respectively, the stored multiple sample matrices indicative of each of the plurality of entities setting the characteristics of the ANN to effect discrimination as between the entities.

7. A method of signal processing according to claim 6 further comprising the steps of skeletonizing the outputs of the matrices by employing a parameter of the cell contents of the fixed size matrices to substantially reduce the requirements for inputs to the input layer of the ANN.

8. A method of signal processing according to claim 7 wherein the parameter is a preselected value for cell content whereupon the contents of all cells are discarded which are less than said preselected value.

9. A method of signal processing system according to claim 6 comprising the further steps of generating weighting coefficients from the multiple sample matrices and setting the characteristics of the ANN using value.

10. A method for signal processing system according to claim 6 comprising the further steps of conducting arithmetic operations on preselected cells of the fixed size matrices to provide outputs indicative thereof, storing training data correlated to the arithmetic operations conducted on multiple sample matrices, and comparing the output of the arithmetic operations with the training data to verify an entity.

\* \* \* \* \*